R. C. CONGDON.
APPARATUS FOR THE MANUFACTURE OF COAL GAS.
APPLICATION FILED APR. 29, 1913.
1,090,813. Patented Mar. 17, 1914.
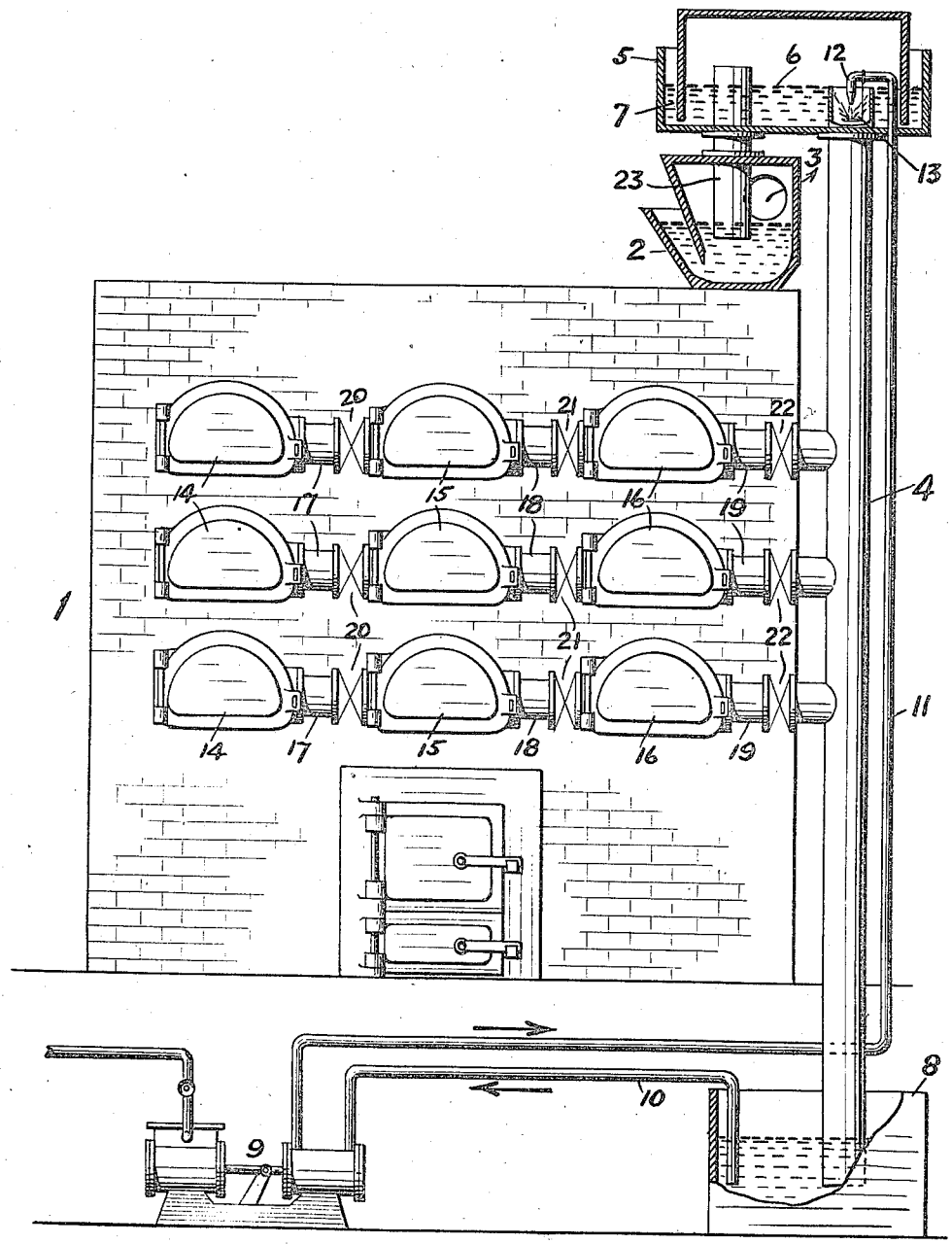
WITNESSES:
Robt R Kitchel.
Frank E French.
INVENTOR
Richard C. Congdon
BY
Augustus B. Stoughton.
ATTORNEY.

UNITED STATES PATENT OFFICE.

RICHARD CROMWELL CONGDON, OF ATLANTA, GEORGIA.

APPARATUS FOR THE MANUFACTURE OF COAL-GAS.

1,090,813.

Specification of Letters Patent.  Patented Mar. 17, 1914.

Application filed April 29, 1913. Serial No. 764,310.

*To all whom it may concern:*

Be it known that I, RICHARD C. CONGDON, a citizen of the United States, and a resident of Atlanta, in the county of Fulton and State of Georgia, have invented certain new and useful Improvements in Apparatus for the Manufacture of Coal-Gas, of which the following is a specification.

The principal objects of the present invention are to prevent the accumulation of tar, pitch and lamp black inside the stand pipe; to scrub the gas in the stand pipe and thus lessen the burden on the balance of the works; to increase the capacity of the exhausters, condensers and scrubbers; to rapidly cool the gas inside the stand pipe, to increase the candle power of the gas; to obviate the expense, annoyance and work of cleaning the stand pipe at frequent intervals by manual or mechanical means, and to reduce the first cost of the installation while attaining the advantages above recited.

Broadly speaking and without disclaiming any novel features of the invention, the above objects are accomplished by the circulation of water, water gas tar, or other fluid inside the stand pipe but without getting it inside the retort or retorts connected to the stand pipe.

The invention will be claimed at the end hereof, but will be first described in connection with the embodiment of it chosen from other embodiments of it for illustration in the accompanying drawings in which there is illustrated in elevation, partly in section, one form of apparatus embodying features of the invention.

In the drawings 1, more or less, diagrammatically illustrates a bench of coal gas retorts and in a similar manner 2 illustrates a hydraulic main having an offtake 3.

4 is a stand pipe.

5 is a tank having a bell with which the stand pipe connects and so arranged that the fluid 6 may be made to overflow down the stand pipe 4 and this equipment 5 performs the function of a bridge pipe and connects the stand pipe 4 with the hydraulic main 2. The seal of the equipment 5 is indicated at 7. At the lower end of the stand pipe 4 there is a seal pot 8. The pump 9 serves to withdraw fluid from the seal pot 8 by the pipe 10 and deliver it by the pipe 11 inside of the stand pipe 4. As shown the pipe 11 is provided with a nozzle 12 and spray device 13 arranged to discharge into the extreme upper end of the stand pipe, but the location at the extreme upper end may be departed from and the discharge arranged somewhat farther down the stand pipe. Each row of retorts is a duplicate of the other so that a description of one row will suffice.

The retort 14 is connected by a valved connection 17 with the retort 15 and the retort 15 is connected by a valved connection 18 with the retort 16 and the retort 16 is connected by a valved connection 19 with the stand pipe 4. The valves are indicated at 20, 21 and 22. The valve 22 serves to disconnect the row of retorts from the stand pipe 4 and the valves 20 and 21 serve to disconnect the retorts from each other.

In use fluid is circulated through the stand pipe 4, meaning that it is introduced into and withdrawn from the stand pipe. Furthermore this fluid does not pass from the stand pipe into the retorts. The fluid thus circulating through the stand pipe preferably in the form of a spray or shower, not only keeps the stand pipe clean, which as is well known is a matter of great importance, but also scrubs and cools the gas in its passage through the pipe on its way through the bridge pipe 5 and drip pipe 23 to the hydraulic main 2. This scrubbing and cooling of the gas in the stand pipe relieves the rest of the apparatus (not shown) from considerable of its work, thus increasing the capacity of the plant and reducing the first cost of installation. Water gas tar can be used as a circulating fluid. Inasmuch as the stand pipe is kept practically clean it is possible and practical to connect a great number of retorts to a single pipe and thus the first cost of installation, as well as the cost of operation, are reduced.

A description of the operation of the valves between the retorts and stand pipe will now be given: Assuming that the retorts are up to heat and are ready to receive the coal and are arranged as shown in the drawing the charging is accomplished each horizontal row as follows:—Close the valves 22 of the two top rows and open the valve 22 of the bottom row; in the bottom row close the valves 20 and 21 and charge coal into the retort 16, then into retort 15; as soon as retort 15 is charged open valve 21 so as to let gas pass from 15 to 16 and into the stand pipe; as soon as retort 14 is charged valve 20 may be opened. From this description it will be readily understood by those skilled in the art how retorts of the other rows may be charged and the gas collected into the single stand pipe.

It will be obvious to those skilled in the art to which my invention relates that modifications may be made in details and hence I do not limit myself in such matters or otherwise than as the prior state of the art may require, but

I claim—

1. In apparatus for the manufacture of coal gas the combination of a group of retorts, a stand-pipe in communication with each of the retorts and extending past the retorts, liquid seals at and for the top and bottom of said stand-pipe common to all the retorts of the group, and means for supplying liquid through the stand-pipe past the retorts without entering the latter.

2. In apparatus for the manufacture of coal gas the combination of a retort, a stand pipe in communication with and extending above and below the retort, a tank or bell with which the stand-pipe connects and arranged to discharge overflow inside the stand pipe, and a liquid seal at the base of the stand pipe and below the retorts.

3. In apparatus for the manufacture of coal gas the combination of a retort, a stand pipe in communication with and extending above and below the retort, fluid seals for the top and bottom of the stand-pipe, means for supplying liquid downward through the stand-pipe and past the retort, and means for withdrawing gas from the retort upward through the stand-pipe.

In testimony whereof I have hereunto signed my name.

RICHARD CROMWELL CONGDON.

Witnesses:
T. A. HAMMOND,
ALEX. W. SMITH, Jr.